Aug. 8, 1950  D. M. CHAPIN  2,517,975
MAGNETOMETER PROBE

Filed July 20, 1949  2 Sheets-Sheet 1

INVENTOR
D. M. CHAPIN
BY
Walter M. Hill
ATTORNEY

Aug. 8, 1950 D. M. CHAPIN 2,517,975
MAGNETOMETER PROBE

Filed July 20, 1949 2 Sheets-Sheet 2

INVENTOR
D. M. CHAPIN
BY
Walter M. Hill
ATTORNEY

Patented Aug. 8, 1950

2,517,975

UNITED STATES PATENT OFFICE 2,517,975

MAGNETOMETER PROBE

Daryl M. Chapin, Basking Ridge, N. J., assignor to Bell Telephone Laboratories, Incorporated, New York, N. Y., a corporation of New York Application July 20, 1949, Serial No. 105,695

7 Claims. (Cl. 175—183)

This invention relates to the art of measuring magnetic flux densities and more particularly to a magnetometer probe for measuring such densities over minute areas.

Experimental work in the theory and in the practical application of magnetic phenomena frequently requires the measurement of a magnetic field at a point. With any actual measuring equipment heretofore known the size of the exploring coil or probe requires that the measurements be over a relatively large area. If static measurements could be made over a very small area, say in the order of about $\frac{1}{10}$ square millimeter or less, the probe would be much more useful and would provide a great deal more information than is now accurately obtainable by any known direct means.

It is therefore the object of this invention to provide a sensitive probe for measuring flux densities over very small areas.

The foregoing object is achieved by this invention which utilizes a piezoelectric crystal vibrating at substantially its resonant frequency to mechanically drive an electric conductor, and a means for measuring the electromotive force generated in said conductor due to its vibratory motion in a magnetic field to be measured.

The invention may be better understood by referring to the accompanying drawings in which:

Figs. 1 and 2 disclose two embodiments of this invention utilizing the longitudinal vibratory mode of a piezoelectric crystal;

Figure 6A:
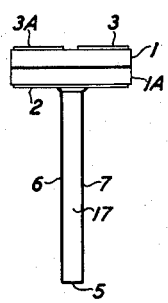
Figure 6:
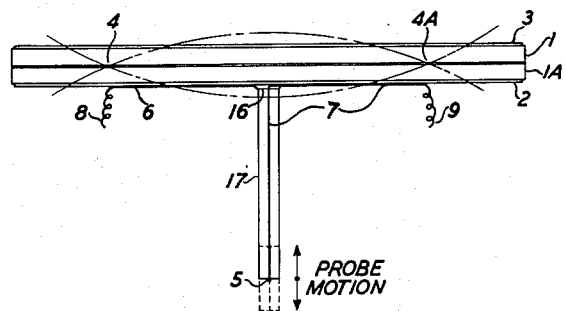
Figure 7:
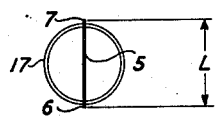

Figs. 6 and 6A disclose a different embodiment of the probe structure of this invention utilizing the flexural vibratory mode of a bimorphic piezoelectric crystal;

Fig. 7 is an enlarged end view of the probe conductor of Fig. 6; and

Figure 4:
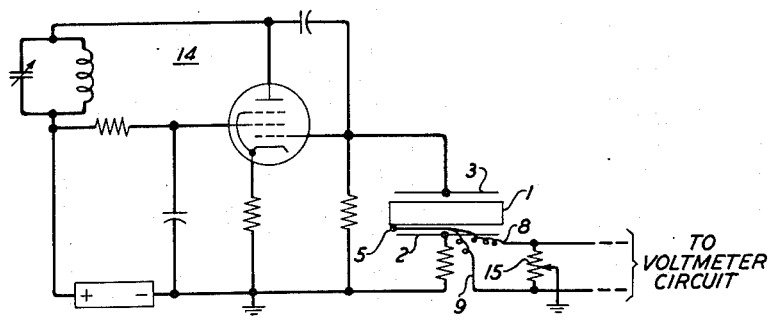
Fig. 4 illustrates one type of oscillator circuit which may be employed to vibrate the crystal of Figs. 1 and 2.
Figure 8:
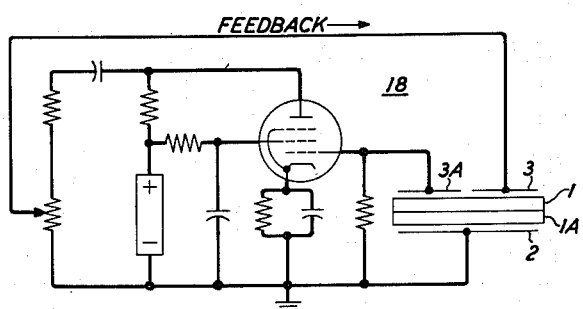

Fig. 8 discloses an oscillator circuit slightly different from that shown in Fig. 4 and especially adaptable for use with the bimorphic crystal structure of Fig. 6.

Figure 1:
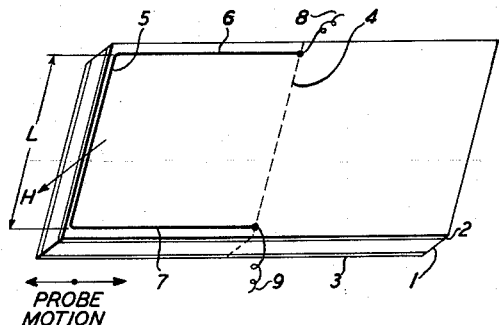

Referring particularly to Fig. 1 it will be noted that the crystal structure comprises a slab 1 of material exhibiting piezoelectric properties and capable of vibrating longitudinally under electric stress. The electric stress is brought to bear on the piezoelectric material 1 by means of the conventional conducting plates 2 and 3 on opposite sides of the crystal material 1. It is known that when a crystal vibrates in this mode there is a plane represented by dotted line 4 near the center of the crystal which constitutes a node and it is at this point where such crystals are usually mounted to their supporting structures. The electrical connections to plates 2 and 3 are not shown in Fig. 1 as they are entirely conventional and require no detail description. Securely cemented to one of the plates, for example, plate 2 as shown in Fig. 1, is a conductor 5 having a length L. This conductor is shown of length substantially coextensive with that of the width of the crystal slab. However, in actual practice this length may be considerably less than that and in most cases the dimension is in the order of one millimeter or less. This conductor 5 is connected to an external circuit by means of two lead conductors 6 and 7 which also are securely cemented with an insulating cement to the surface of conducting plate 2. At the nodal plane defined by dotted line 4, these two conductors 6 and 7 are connected to the external circuit through flexible lead wires 8 and 9. It will be evident from a knowledge of well-known fundamental principles that if this crystal is immersed in a magnetic field having a direction as shown by vector H, an alternating voltage will be generated therein proportional to the product of the length of the conductor, times the frequency of vibration of the crystal, times the maximum vibrating amplitude of the conductor 5, times the density of the magnetic field. It will at once be recognized that since the length of the conductor, the amplitude of its vibration and the frequency are all kept substantially constant, the voltage generated will be proportional only to the density of the magnetic field.

Figure 2:
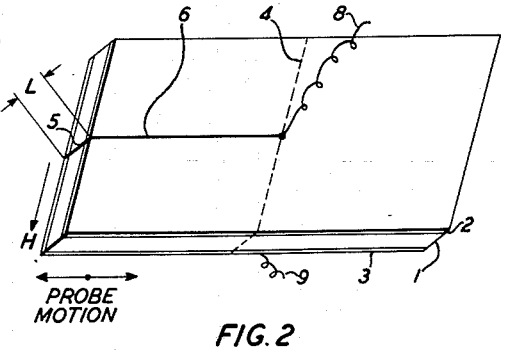

The embodiment of the invention disclosed in Fig. 2 is essentially the same as that in Fig. 1 except that the vibrating conductor 5 is carried across an end of the crystal from one of the conducting plates 2 to the other conducting plate 3. The effective length L in this case is approximately equal to the thickness of the crystal structure including its conductive plates 2 and 3. While this embodiment of the invention has been found quite operative, it is preferred to use the arrangement shown in Fig. 1 as it provides better shielding thereby reducing the electrostatic pickup from the crystal driving circuit. The other parts of the crystal and probe structure, for example, the lead conductors 8 and 9 and the crystal 1 are all identical with that of Fig. 1 and the corresponding parts carry the same reference numerals.

Figure 3:
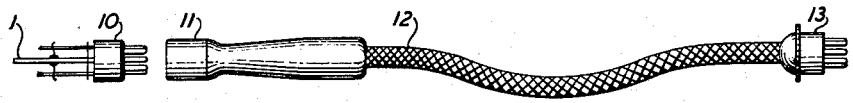
Fig. 3 illustrates a mounting structure for the crystals of Figs. 1 and 2 as well as a flexible lead for connection to the measuring apparatus.

The crystals of Figs. 1 and 2 may be mounted on a base 10 as shown in Fig. 3. This base is similar to that commonly used for vacuum tubes and also generally used for mounting crystal structures. The glass envelope customarily surrounding the crystal, however, is not used as it would interfere with the use of the probe structure. The crystal is mounted on the base 10 by means of supporting posts and wires in the usual manner and the lead wires 8 and 9 are carried to appropriate prongs in the base 10. The prongs on this base may be inserted in a socket 11 having a handle as shown in Fig. 3 and from which the conductors are carried by means of a cable 12 to a plug 13. Fig. 3 is merely illustrative of a preferred manner of mounting the probe structure and is not to be regarded as restrictive as many other means may be employed depending upon the use to be made of the probe. All of the component structures shown in Fig. 3 are well known in the art and because of such familiarity they need not be described in further detail.

Fig. 4 illustrates an oscillator circuit 14 of conventional design and because of its simplicity is preferred for driving this crystal probe. It is evident that because of the very high Q of piezoelectric crystals, the driving frequency must be very close to the resonant frequency of the crystal and consequently the most efficient way of driving such a crystal would be by means of an oscillator of which the crystal forms a part of the frequency-determining network. While a particular type of oscillator has been shown, any other oscillator circuit, the frequency of which may be controlled by a crystal, may be substituted. The various parts of the crystal structure including the probe conductor 5 are shown schematically in Fig. 4 and carry the same reference numerals as they do in Fig. 1. A potentiometer 15 may be connected across the conductors 8 and 9 and by adjusting its center tap, which should be grounded, the effect of electrostatic pick-up may be reduced.

Figure 5:
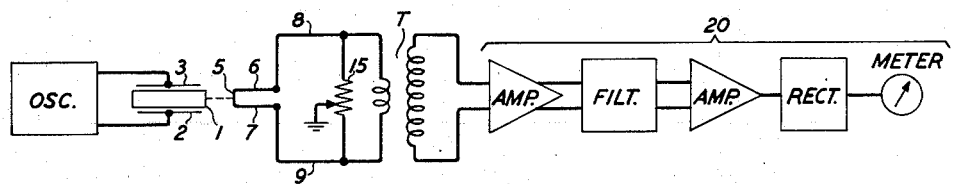
Fig. 5 is the schematic block diagram of a complete measuring system embodying the principles of this invention.

A complete system is shown in schematic block form in Fig. 5. In this figure the crystal 1 is shown coupled to an oscillator to drive it at its natural resonant frequency. This portion of the circuit corresponds with Fig. 4. The probe conductor 5 is shown separated from the crystal 1 but coupled thereto through a mechanical link indicated by the dotted line connecting these two parts. This is only for simplicity in the circuit diagram for actually the conductor is mounted on the crystal or to some rigid structure integral with the crystal as will become more clear in connection with Fig. 6. The connecting conductors 6, 7, 8 and 9 and the potentiometer 15 are identical with the same parts in Fig. 4. Conductors 8 and 9 are coupled to a voltmeter circuit 20 through a transformer T. In order to override the tube noise in the first tube this transformer is preferably of large turn ratio, for example, a ratio of 1 to 400. This latter ratio will give a 52-decibel voltage gain which has been found sufficient to override the tube noise so that the sensitivity is limited by probe noises rather than by tube noises. While this is one convenient method of coupling the voltmeter circuit to the probe, it should be understood that this is not restrictive but merely illustrative of such coupling circuits. The meter circuit 20 may take on a variety of forms. In Fig. 5 it is shown as an amplifier-detector, the amplifier being in two sections with a tuned circuit or a filter between them. The output is converted to direct current by means of the rectifier and observed on a meter. Such circuits, of course, are quite conventional.

The crystal structures of Figs. 1 and 2 are especially adapted for vibrating the conductor at high frequencies. Lower frequencies may be obtained by using a conventional bimorphic type crystal as shown in Fig. 6. These crystals consist of two quartz crystals 1 and 1A joined together but electrically reversed so that when one expands under the influence of an electric field the other contracts. A flexural motion of comparatively large amplitude and low frequency is produced. The supports for the crystal are placed at the nodes 4 and 4A. The center of the crystal vibrates with maximum amplitude and the motion is illustrated by the dotted arcs intersecting at the nodal points 4 and 4A. This type of crystal is connected in an oscillator circuit by connection to the conducting plates 2 and 3. Plate 3 is frequently separated into two parts, the other part being designated by reference numeral 3A in Fig. 6A. By reason of the flexural motion produced by the electric stress applied to plates 2 and 3, a voltage is generated between plates 3A and 2, which voltage is used as the feedback voltage for driving the oscillator.

The probe conductor 5 is not mounted directly to the bimorphic crystal plate 2, although it could be. As shown in Fig. 6, however, it is preferred to mount this conductor 5 on the end of a lightweight tube having a diameter of approximately one millimeter or less. This tube 17, as shown in Fig. 6, is cemented to plate 2 at a point of maximum amplitude 16. The motion of the conductor 5 and the tube 17 is illustrated by the dotted lines in Fig. 6. Of course all of these motions are greatly exaggerated in order to clearly illustrate the principle of the invention. Actually this motion may be in the order of about $\frac{1}{10}$ of a millimeter for a bimorphic crystal oscillating at approximately 900 cycles per second.

Fig. 7 shows an end view of the tube 17 and the conductor 5. Conductor 5 is cemented to the end of the tube 17 and lead conductors 6 and 7 are carried along the sides of this tube as shown in Fig. 6 and connected to lead wires 8 and 9 at the nodal points 4 and 4A respectively.

An oscillator circuit 18 suitable for driving the bimorphic crystal of Fig. 6 is shown in Fig. 8. This oscillator circuit, like the oscillator circuit of Fig. 4, is also of conventional design. The two crystal slabs 1 and 1A constituting the bimorphic crystal are shown in this figure as being mounted between the conductive plates 2, 3 and 3A. The probe conductor 5 and its mounting tube 17 have been deleted from this disclosure for the sake of clarity. The lead conductors 8 and 9, however, are carried to an external voltmeter circuit just as shown in Figs. 4 and 5, respectively.

This apparatus has been found extremely useful for rapidly measuring magnetic field densities in very small areas. Probe structures have been constructed and found to satisfactorily measure flux densities in areas ranging from approximately $\frac{1}{10}$ of a square millimeter down to approximately 1/2000 of a square millimeter. To illustrate the present capabilities of this invention a probe structure of the type shown in Fig. 2 was constructed with a probe conductor of about 60 microns in diameter. This probe was driven at a frequency of 49 kilocycles per second and had a total motion of about ½ micron. The length L of the conductor was approximately one millimeter. This probe was used to obtain measurements of the field existing in the domain boundaries on the surface of a demagnetized cobalt crystal. This crystal, which to all intents and purposes was demagnetized in so far as its external magnetism was concerned, was found to have a field component parallel to its surface and at about $\frac{1}{10}$ millimeter therefrom of about 20 gauss. Still smaller areas may be scanned by a structure of this type by making the probe conductor 5 from a thin conducting film of only a few atom diameters thick. With this smaller probe dimension the crystal frequency may be made still higher with a much smaller crystal motion. One of the more common uses to which this apparatus may be put is for measuring fields close to the flat surfaces of various magnetic structures, as for example, magnetic recording tape. The probe may also be used for mapping external magnetic fields around various electromagnetic structures.

What is claimed is:

1. A magnetometer probe for measuring magnetic fields over minute areas comprising a piezoelectric crystal, means for coupling said crystal to an electric circuit for vibrating it at substantially its resonant frequency, a conductor mechanically coupled to the crystal whereby the conductor may be vibrated by the crystal in a direction transverse to the length of the conductor, and terminals connected to said conductor for connection to a means for measuring the electromotive force induced in said conductor due to its vibratory motion in a magnetic field.

2. A magnetometer probe for measuring magnetic fields over minute areas comprising a piezoelectric crystal, means for coupling said crystal to an electric circuit for vibrating it at substantially its resonant frequency, a conductor mounted on said crystal with its length transverse to the direction of the vibratory motion of the crystal, and terminals connected to said conductor for connection to a means for measuring the electromotive force induced in said conductor due to its vibratory motion in a magnetic field.

3. A magnetometer probe for measuring magnetic fields over minute areas comprising a piezoelectric crystal, means for coupling said crystal to an electric circuit for vibrating it at substantially its resonant frequency, said means including a conductive drive plate along a face of said crystal so constructed as to be vibrated by the crystal motion, a conductor mounted on said conductive plate with its length transverse to the direction of the vibratory motion of the crystal, and terminals connected to said conductor for connection to a means for measuring the electromotive force induced in said conductor due to its vibratory motion in a magnetic field.

4. A magnetometer probe for measuring magnetic fields over minute areas comprising a piezoelectric crystal capable of vibratory motion in its longitudinal mode, means for coupling said crystal to an electric circuit for vibrating it at substantially its resonant frequency, a conductor mounted across one of the ends of said crystal at a point of maximum motion and with the length of the conductor transverse to the direction of that motion, and terminals connected to said conductor for connection to a means for measuring the electromotive force induced in said conductor due to its vibratory motion in a magnetic field.

5. A magnetometer probe for measuring magnetic fields over minute areas comprising a rectangular piezoelectric crystal capable of vibratory motion in its longitudinal mode and having dimensions of thickness width and length, means for vibrating said crystal at substantially its resonant frequency, a conductor attached to said crystal and parallel to a face thereof having thickness and width dimensions only, and terminals connected to said conductor for connection to a means for measuring the electromotive force induced in said conductor due to its vibratory motion in a magnetic field.

6. A magnetometer probe for measuring magnetic fields over minute areas comprising a bimorphic piezoelectric crystal capable of flexural vibration, means for vibrating said crystal at substantially its resonant frequency, a conductor, means for mounting said conductor on a face of said crystal at a point of maximum motion, and terminals connected to said conductor for connection to a means for measuring the electromotive force induced in said conductor due to its vibratory motion in a magnetic field.

7. The combination of claim 6 wherein said mounting means comprises a lightweight tube, one end of which is attached to the crystal at its point of maximum motion and the other end of which is adapted for mounting said conductor.

DARYL M. CHAPIN.

No references cited.